(12) United States Patent
Wong et al.

(10) Patent No.: US 9,983,785 B2
(45) Date of Patent: May 29, 2018

(54) INPUT MODE OF A DEVICE

(75) Inventors: Glenn A Wong, Foster City, CA (US); Mark C Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1946 days.

(21) Appl. No.: 13/192,990

(22) Filed: Jul. 28, 2011

(65) Prior Publication Data
US 2013/0027290 A1  Jan. 31, 2013

(51) Int. Cl.
G09G 5/00 (2006.01)
G06F 3/0488 (2013.01)
G06F 3/01 (2006.01)

(52) U.S. Cl.
CPC .......... *G06F 3/04886* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 2007/0247442 A1* | 10/2007 | Andre et al. ................. | 345/173 |
| 2008/0316183 A1 | 12/2008 | Westerman | |
| 2009/0160785 A1 | 6/2009 | Chen et al. | |
| 2010/0007613 A1 | 1/2010 | Costa | |
| 2010/0099463 A1 | 4/2010 | Kim et al. | |
| 2010/0231612 A1* | 9/2010 | Chaudhri ............ | G06F 3/04886 345/684 |
| 2011/0248941 A1* | 10/2011 | Abdo ................... | G06F 3/0488 345/173 |
| 2012/0068937 A1* | 3/2012 | Backlund .............. | G06F 3/0237 345/173 |
| 2012/0124481 A1 | 5/2012 | Campbell | |
| 2012/0159372 A1* | 6/2012 | Stallings .......... | H04N 21/42208 715/773 |
| 2012/0235924 A1 | 9/2012 | Hochmuth | |
| 2013/0257746 A1 | 10/2013 | Cherkasov | |

FOREIGN PATENT DOCUMENTS

| | | |
|---|---|---|
| EP | 2320312 A1 | 5/2011 |
| JP | 2007172232 | 7/2007 |
| KR | 20090008751 | 1/2009 |
| WO | WO-2006020304 | 2/2006 |

OTHER PUBLICATIONS

Hansoo, http://www.careace.net/2011/05/11/essential-tips-for-the-samsung-infuse-4g/, Essential Tips for the Samsung Infuse 4G, May 11, 2011 (14 pages).

* cited by examiner

*Primary Examiner* — Patrick Edouard
*Assistant Examiner* — Douglas M Wilson
(74) *Attorney, Agent, or Firm* — HPI Patent Department

(57) ABSTRACT

A device to detect a directional hand gesture, identify an input mode of the device associated with the directional hand gesture to launch the input mode, modify a user interface rendered on a display component of the device based on the input mode, and modify a setting of the sensor based on whether the input mode includes a virtual keyboard.

21 Claims, 6 Drawing Sheets

INPUT MODE OF A DEVICE

BACKGROUND

If a user is interfacing with a display component of a device through a touch screen interface or a virtual keyboard interface, the user can switch between one or more input modes for the device by accessing an exit button or an exit menu for the currently loaded input mode. Once the currently loaded input mode has been terminated, the user can proceed to launch another input mode for the device by navigating through a list of available input modes or programs for the device. This may lead to delays, frustration, and/or confusion for the user as the user attempts to switch from one input mode to another.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A device can include a sensor to detect a directional hand gesture from a user. In one embodiment, the sensor can be an image capture component. In another embodiment, the sensor can be a touchpad, a touch screen, and/or a touch wall of the device. By detecting the directional hand gesture with a sensor, the device can identify information of the directional hand gesture and identify an input mode of the device associated with the directional hand gesture. The device can then conveniently launch the input mode without the user expending time to locate an exit menu or exit button of the input mode. The device can also modify a user interface rendered on a display component based on the launched input mode and modify a setting of the sensor based on whether the launched input mode uses a virtual keyboard. The virtual keyboard can be a soft keyboard including alphanumeric characters which can be displayed as part of the user interface.

In one example, if a virtual keyboard interface mode is launched, the device can switch from a currently used input mode, such as a touch screen interface mode, to the virtual keyboard interface mode and the user interface can be modified to include a virtual keyboard. Additionally, the device can increase a sensitivity of the sensor to improve an accuracy of the sensor when detecting inputs for the virtual keyboard interface mode. In another example, if a touch screen interface mode is launched, the device can switch from the current input mode, such as a virtual keyboard interface mode, to the touch screen interface mode and the user interface can be modified to not display the virtual keyboard. Further, the device can decrease a sensitivity or an amount of power supplied to the sensor to save power that may not be utilized by the sensor when used by the touch screen interface mode. As a result, a user can use a directional hand gesture to conveniently enter and/or transition between one or more input modes of the device.

Figure 1:
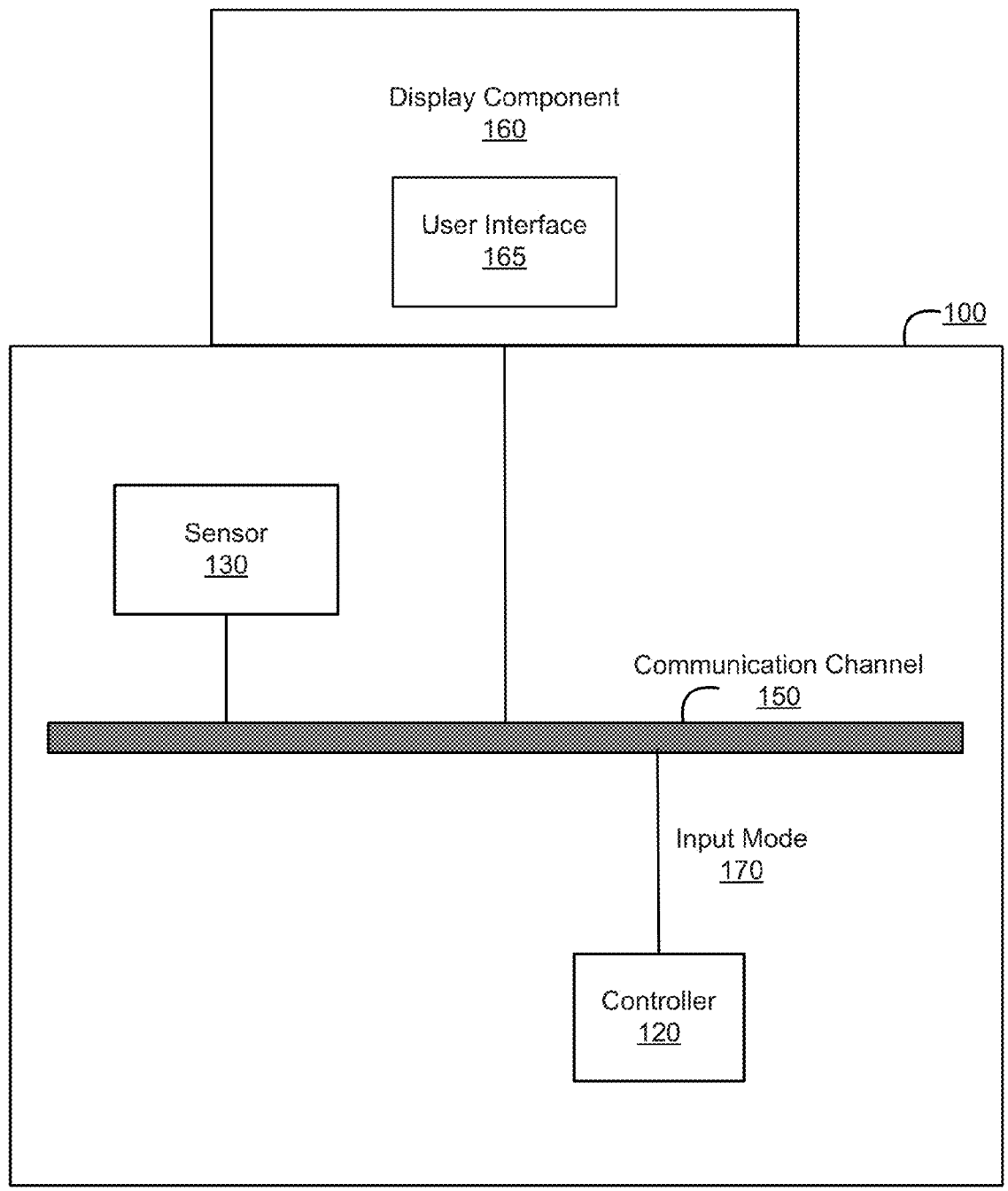
FIG. 1 illustrates a device with a display component and a sensor according to an example.

FIG. 1 illustrates a device 100 with a display component 160 and a sensor 130 according to an example. In one embodiment, the device 100 can be a touch system, a touch wall, a large interactive display, an all-in-one system, desktop, and/or a server. In another embodiment, the device 100 can be a laptop, a notebook, a tablet, a netbook, and/or a tablet. In other embodiments, the device 100 can be a cellular device, a PDA (Personal Digital Assistant), an E (Electronic)—Reader, and/or any additional device which can include a display component 160 and a sensor 130.

The device 100 includes a controller 120, a display component 160, a sensor 130, and a communication channel 150 for the device 100 and/or one or more components of the device 100 to communicate with one another. In one embodiment, the device 100 includes an input application stored on a computer readable medium included in or accessible to the device 100. For the purposes of this application, the input application is an application which can be utilized in conjunction with the controller 120 to manage input for the device 100.

When managing input for the device 100, a sensor 130 detects for a directional hand gesture from a user of the device 100. The sensor 130 can be a hardware component of the device 100 which can detect for a hand, a finger, a palm, and/or a pointing device when detecting for a directional hand gesture from the user. In one embodiment, the sensor 130 can be an image capture component. In another embodiment, the sensor 130 can include a touch sensitive pad or surface, such as a touchpad of the device 100 or a touch screen coupled to the display component 160.

For the purposes of this application, a directional hand gesture can include one or more motions made with a hand, a finger, and/or a pointing device of the user as the user is interacting with the device 100. When detecting a directional hand gesture, the sensor 130 can detect for the hand, the finger, the palm, and/or the pointing device repositioning from one location to another. In one embodiment, the sensor 130 additionally detects for the hand, the finger, the palm, and/or the pointing device making contact with the display component 160.

In response to detecting a directional hand gesture, the sensor 130 can pass information of the directional hand gesture to the controller 120 and/or the input application. The controller 120 and/or the input application can then proceed to identify an input mode 170 of the device 100 associated with the directional hand gesture. For the purposes of this application, an input mode 170 of the device 100 corresponds to an input method of the device 100 which the user can use to interact and enter inputs for the device 100.

In one embodiment, an input mode 170 of the device 100 can be a virtual keyboard interface mode of the device 100 and the user can use the virtual keyboard to enter inputs for the device 100. For the purposes of this application, the virtual keyboard can include one or more alphanumeric characters which can be rendered as part of a user interface 165 displayed on a display component 160. The sensor 130 can detect for inputs for the device 100 by detecting one or more locations of the virtual keyboard being accessed by the user. In another embodiment, an input mode 170 of the device 100 can be a different layout of the virtual keyboard or a different type of virtual keyboard. In other embodiments, an input mode 170 of the device 100 can be a touch interface mode of the device 100 which does not use a virtual keyboard. The sensor 130 can detect for the user touching one or more locations of the touch interface to interact and enter inputs for the device 100.

When determining which input method of the device 100 is associated with a directional hand gesture, the controller 120 and/or the input application compares information of the directional hand gesture to predefined information of one or more input modes 170 of the device 100. If an input mode 170 includes a predefined sequence of vertical motions and/or horizontal motions which match the directional hand gesture, the input mode 170 will have been identified. The controller 120 and/or the input application then proceed to launch the identified input mode 170 of the device 100 associated with the directional hand gesture.

Launching an input mode 170 of the device 100 can include transitioning the device 100 from a touch screen interface mode to a virtual keyboard interface mode. In another embodiment, launching an input mode 170 includes changing a layout of the virtual keyboard or loading another type of virtual keyboard. In other embodiments, launching an input mode 170 includes transitioning the device 100 from a virtual keyboard interface mode to a touch screen interface mode. Based on the input mode 170, the controller 120 and/or the input application can modify a user interface 165 rendered on a display component 160 of the device 100.

The display component 160 is an output device, such as a LCD (liquid crystal display), a LED (light emitting diode) display, a CRT (cathode ray tube) display, a plasma display, a projector and/or any additional device configured to display a user interface 165. The user interface 165 can be a graphical user interface of the device 100 which the user can interact with. In one embodiment, modifying the user interface 165 includes the controller 120 and/or the input application updating the user interface 165 to display a virtual keyboard. In another embodiment, modifying the user interface 165 includes updating a layout of the virtual keyboard displayed on the user interface 165 or displaying another type of virtual keyboard. In other embodiments, modifying the user interface 165 includes rendering the user interface 165 to not display the virtual keyboard.

The controller 120 and/or the input application can also modify a setting of the sensor 130 based on whether the input mode 170 uses a virtual keyboard. In one embodiment, modifying a setting of the sensor can include modifying a sensitivity of the sensor 130. In another embodiment, modifying a setting of the sensor 130 can include modifying an amount of power supplied to the sensor 130. The sensor 130 can be used in the input mode 170 to operate as an input component for the controller 120 and/or the input application to detect for the user accessing locations of the user interface 165. The corresponding accessed locations can be identified by the controller 120 and/or the input application to be a selection, an enter command, and/or pointer click.

Figure 2:
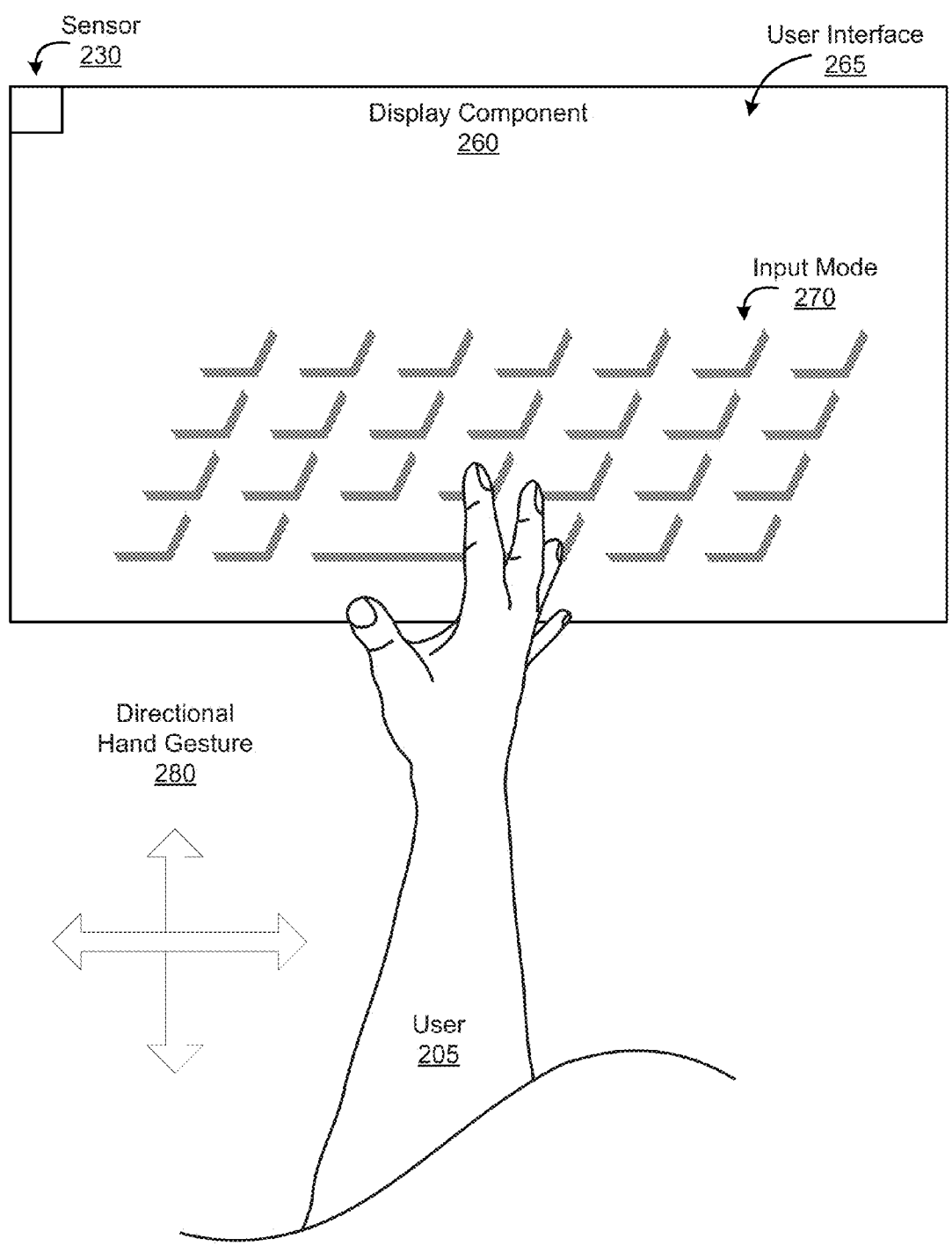
FIG. 2 illustrates a sensor detecting a directional hand gesture from a user according to an example.

FIG. 2 illustrates a sensor 230 detecting a directional hand gesture 280 from a user 205 according to an example. A sensor 230 is a hardware component of the device 200 configured to detect a directional hand gesture 280 from a user 205 in response to the user 205 interacting with a user interface 265 the device. As noted above, the user interface 265 can be a graphical user interface which can be rendered on a display component 260. In one embodiment, the display component 260 can be a touch wall and/or a large interactive display. In one embodiment, the sensor 230 can be an image capture component, such as a depth camera. In another embodiment, the sensor 230 can include a touch component, such as a touch sensitive pad, a touch surface, and/or a touch screen. The touch component can be coupled to the display component 260 of the device. In other embodiments, the sensor 230 can be any additional hardware component of the device configured to detect for a directional hand gesture 280 from a user 205.

The user 205 can be any person which can interact with the user interface 265 by making one or more motions in front of the display component 260. In another embodiment, the user 205 can interact with the user interface 265 by touching a screen of the display component 260 and/or by making one or more motions while touching the screen of the display component 260. The user 205 can use a finger, hand, palm, and/or any additional part of the user's body to interact with the user interface 265. In another embodiment, the user 205 can use an accessory, such as a stylus or any other pointing device, to interact with the user interface 265. If the user 205 is detected to be interacting with the user interface 265, the sensor 265 can detect information of the user 205 making one or more directional hand gestures 270.

As noted above, a directional hand gesture 280 can include one or more motions made with a hand, a finger, and/or a pointing device of the user 205 as the user 205 is interacting with a user interface 265. When detecting a directional hand gesture 280, the sensor 230 can detect for the user 205 making a sequence of vertical motions and/or a sequence of horizontal motions. In one embodiment, the sensor 230 can additionally detect for a first location of where the directional hand gesture 280 begins and a second location of where the directional hand gesture 280 ends to identify the direction of the movement. In another embodiment, the sensor 230 can further detect for the user 205 touching a screen of the display component 260. In other embodiment, the sensor 230 can detect a number of fingers used by the user 205 when making the directional hand gesture 280.

In response to detecting a directional hand gesture 280 from the user 205, the sensor 230 can share information of the directional hand gesture 280 with a controller and/or an input application of the device. The controller and/or the input application can then identify an input mode 270 of the device associated with the directional hand gesture 280. As noted above, an input mode 270 of the device corresponds to an input method of the device which the user can use to interact with the device and to enter inputs for the device.

As shown in FIG. 2, an input mode 270 of the device can be a virtual keyboard interface mode. The virtual keyboard can be a soft keyboard which can be displayed as part of the user interface 265. If the virtual keyboard is displayed, the sensor 230 can operate as an input component for the device and detect for the user accessing locations of the virtual keyboard displayed on the display component 260. The controller and/or the input application can identify a corresponding alphanumeric or keystroke input corresponding to the accessed location. In another embodiment, an input mode 270 of the device can be a different layout of the virtual keyboard or a different type of virtual keyboard which can be rendered as part of the user interface 265. In other embodiments, an input mode 270 of the device can be a touch interface for the user interface 265 which does not include a virtual keyboard.

Figure 3:
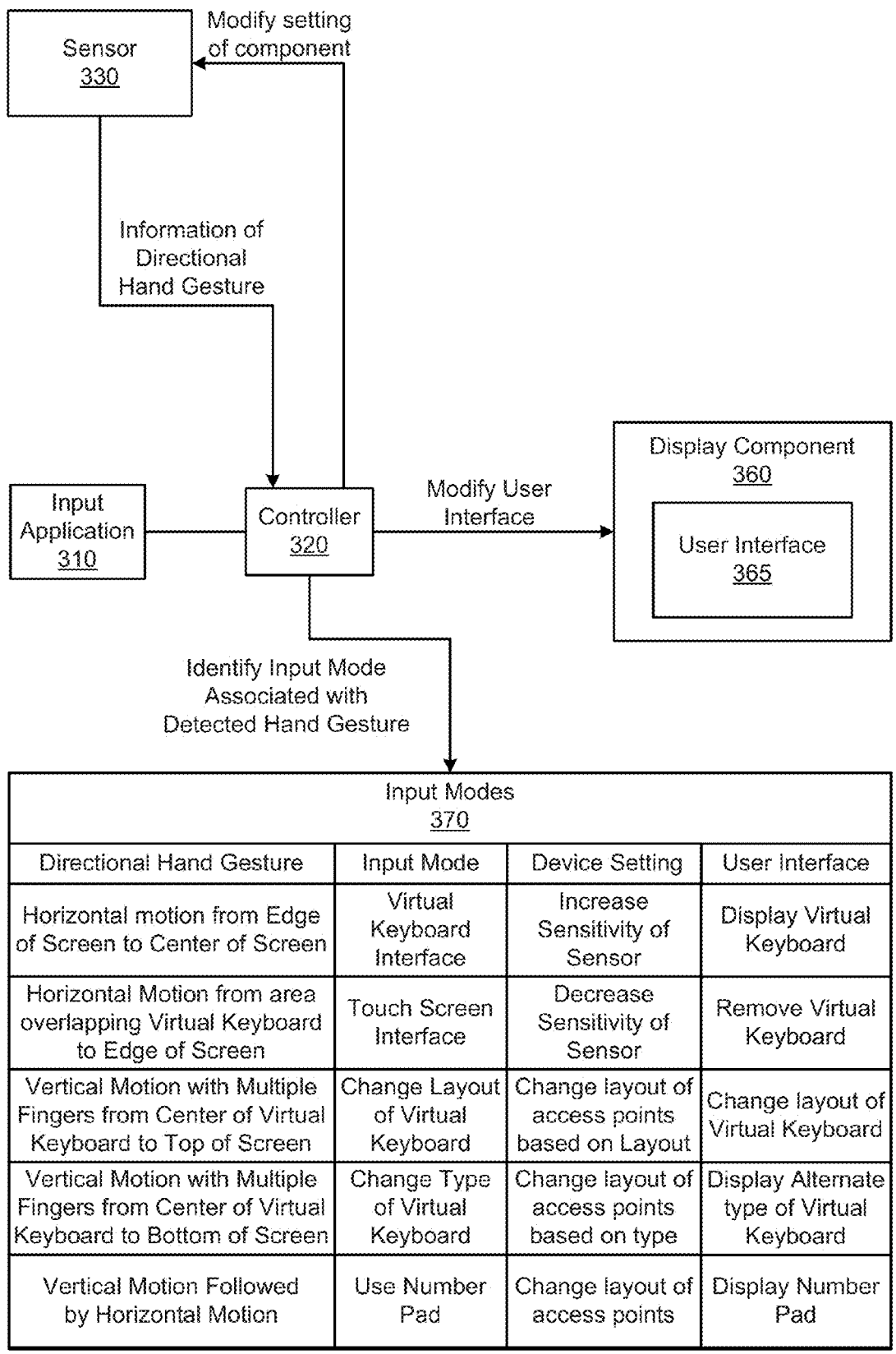
FIG. 3 illustrates a block diagram of an input application to identify an input mode for a device associated with a directional hand gesture and to modify a user interface based on the input mode according to an example.

FIG. 3 illustrates a block diagram of an input application 310 to launch an input mode for a device associated with a directional hand gesture and to modify a user interface 365 based on the input mode according to an example. As shown in FIG. 3, the sensor 330 has detected a directional hand gesture and information of the directional hand gesture is shared with the controller 320 and/or the input application 310. The controller 320 and/or the input application 310 proceed to identify an input mode of the device associated with information of the directional hand gesture.

In one embodiment, as shown in FIG. 3, the controller 320 and/or the input application 310 can access a list of input modes 370. The list 370 can include one or more entries and can be locally or remotely accessed. Each entry of the list 370 can include predefined information of a directional hand gesture and a corresponding input mode associated with the directional hand gesture. Additionally, each entry can include corresponding settings of the device associated with the input mode and/or information of updating a user interface of the device. In one embodiment, each entry of the list 370 can additionally include an instruction to launch the corresponding input mode associated with the directional hand gesture.

The controller 320 and/or the input application 310 compare the information of the directional hand gesture to predefined information included in the entries of the list 370. If the information matches any of the predefined information included in the entries, the corresponding input mode of the matching entry is identified by the controller 320 and/or the input application 310 to be associated with the directional hand gesture. The controller 320 and/or the input application 310 then proceed to launch the identified input mode and modify a user interface 365 based on the identified input mode.

As noted above, launching an input mode can include loading a virtual keyboard interface mode for the user to use a virtual keyboard when interacting with the device. In another embodiment, launching an input mode can additionally include changing a layout of the virtual keyboard and/or loading another type of virtual keyboard. Loading another type of virtual can include changing the virtual keyboard from an alphanumeric keyboard to a virtual keyboard for another language or country. In other embodiments, launching an input mode can include terminating a virtual keyboard interface mode and transitioning the device into a touch screen interface mode.

As the identified input mode is launched, the controller 320 and/or the input application 310 can modify a user interface 365 rendered on the display component 360 based on the identified input mode. Modifying the user interface 365 can include re-rendering the user interface 365. In one embodiment, modifying the user interface 365 includes the controller 320 and/or the input application 310 updating the user interface 365 to display a virtual keyboard. In another embodiment, modifying the user interface 365 includes updating a layout of the virtual keyboard displayed or displaying another type of virtual keyboard on the user interface 365. In other embodiments, modifying the user interface 365 includes rendering the user interface 365 to not display a virtual keyboard.

Based on whether the input mode uses a virtual keyboard, the controller 320 and/or the input application 310 can modify a setting of the sensor 330 used by the input mode. In one embodiment, modifying a setting of the sensor 330 can include increasing or decreasing a sensitivity of the sensor 330. In another embodiment, modifying a setting of the sensor 330 additionally includes increasing or decreasing an amount of power supplied to the sensor 330. In other embodiments, the controller 320 and/or the input application 310 can modify additional settings of the sensor 330 or another component used by the input mode based on whether the input mode uses a virtual keyboard.

In one example, the sensor 330 detects a directional hand gesture with a horizontal motion from the edge of the screen of the display component 360 to the center of the screen. The controller 320 and/or the input application 310 determine that the input mode associated with the directional hand gesture is a virtual keyboard interface mode and proceed to execute an instruction to launch the virtual keyboard interface mode. The controller 320 and/or the input application 310 then modify the user interface 365 to display the virtual keyboard. Because the input mode uses a virtual keyboard, the controller 320 and/or the Input application 310 increase a sensitivity of the sensor 330 to improve an accuracy of detecting which soft key of the virtual keyboard a user may access.

In a second example, the sensor 330 detects a horizontal motion from an area overlapping a displayed virtual keyboard to the edge of the screen. The controller 320 and/or the input application 310 determine that the input mode associated with the directional hand gesture is a touch screen interface mode and proceed to execute an instruction to launch the touch screen interface mode. In one embodiment, the controller 320 and/or the input application 310 exit the virtual keyboard interface mode and modify the user interface 365 to remove the virtual keyboard from display. Because the input mode does not use a virtual keyboard, the controller 320 and/or the input application 310 proceed to decrease a sensitivity of the sensor 330. In one embodiment, decreasing a sensitivity can include decreasing an amount of power supplied to the sensor 330 from a power source coupled to the device.

In a third example, the sensor 330 detects a vertical motion with more than one finger from a center of a displayed virtual keyboard to a top of the screen. The controller 320 and/or the input application 310 proceed to execute an instruction to change the virtual keyboard. Changing the virtual keyboard can include changing the layout to a QWERTY layout. The controller 320 and/or the input application 310 modify the user interface 365 to display the modified layout of the virtual keyboard. Additionally, the controller 320 and/or the input application 310 modify the sensor 330 by changing a layout or location of access points to be detected by the sensor 330 based on updated locations of the corresponding alphanumeric keys. Because the input mode uses a virtual keyboard, a sensitivity of the sensor 330 can also be increased if not already increased by the controller 320 and/or the input application 310 for a virtual keyboard input mode. In one embodiment, the controller 320 and/or the input application 310 can also modify a language setting of the device based on a different layout or type of virtual keyboard.

Figure 4:
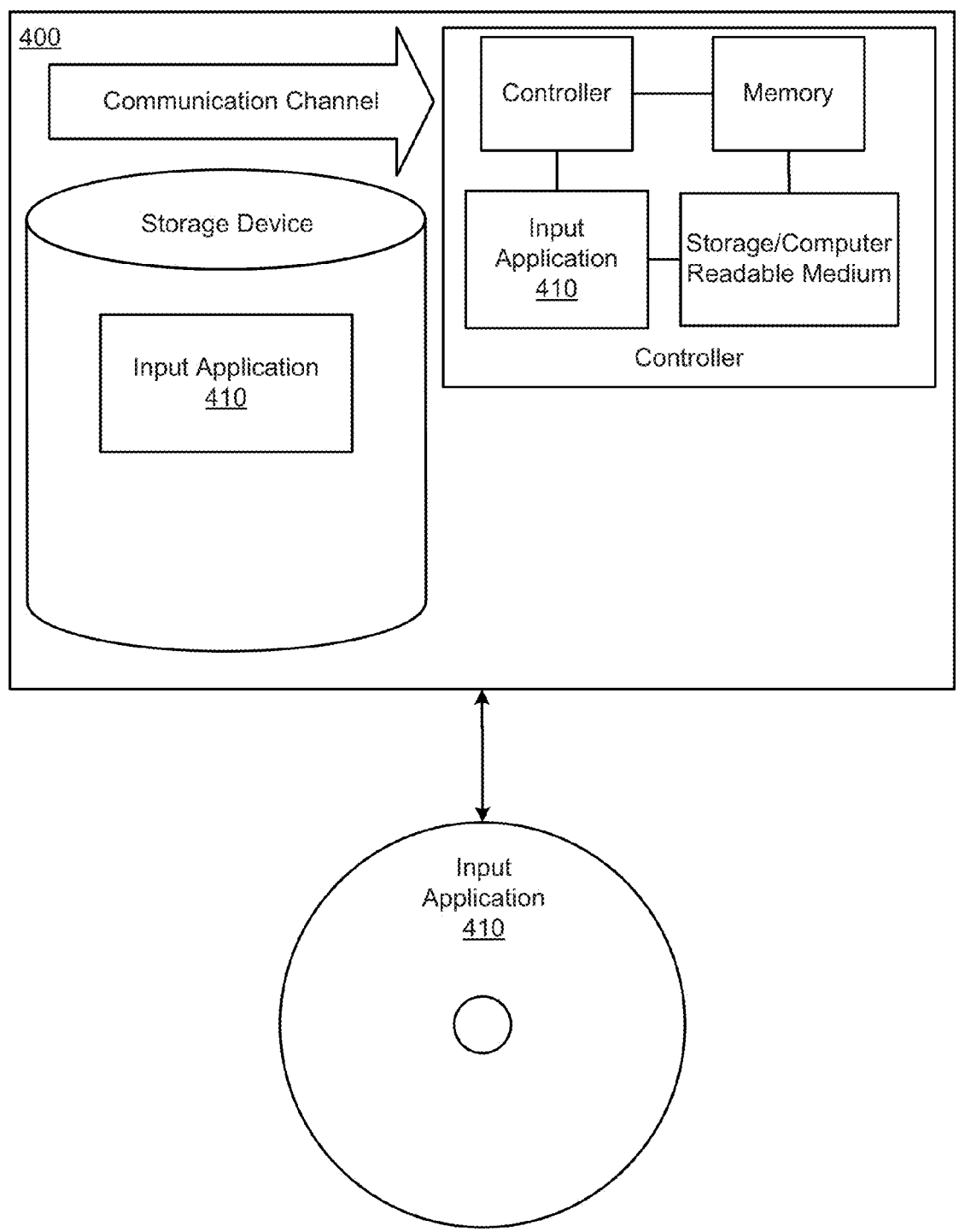
FIG. 4 illustrates an input application on a device and the input application stored on a removable medium being accessed by the device according to an example.

FIG. 4 illustrates an input application 410 on a device 400 and the input application 410 stored on a removable medium being accessed by the device 400 according to an embodiment. For the purposes of this description, a removable medium is any tangible apparatus that contains, stores, communicates, or transports the application for use by or in connection with the device 400. In one embodiment, the input application 410 is firmware that is embedded into one or more components of the device 400 as ROM. In other embodiments, the input application 410 is an application which is stored and accessed from a hard drive, a compact disc, a flash disk, a network drive or any other form of computer readable medium that is coupled to the device 400.

Figure 5:
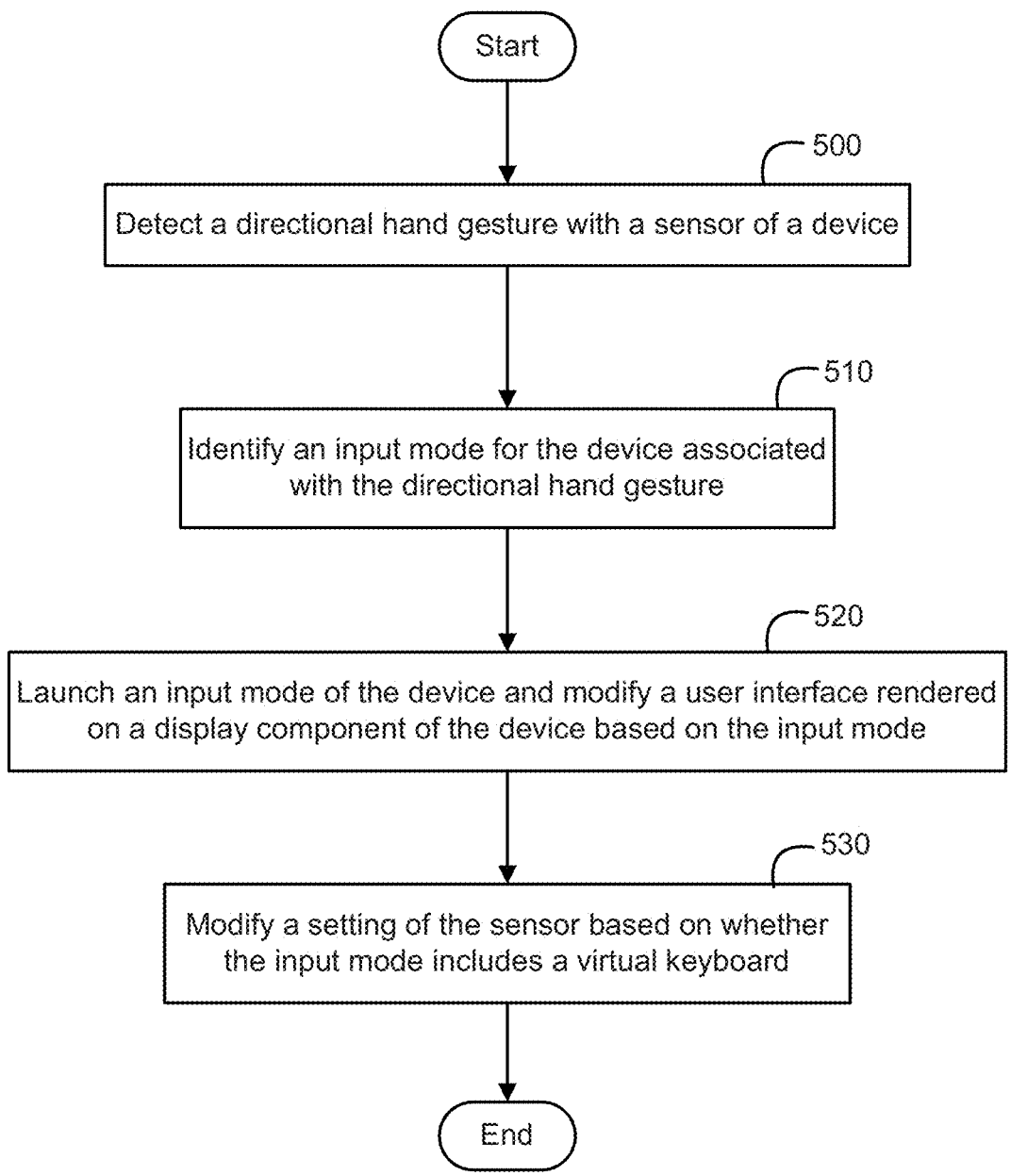
FIG. 5 is a flow chart illustrating a method for managing input for a device according to an example.

FIG. 5 is a flow chart illustrating a method for managing input for a device according to an embodiment. An input application can be utilized independently and/or in conjunction with a controller to manage inputs for the device. As noted above, a sensor of the device can be used to detect a directional hand gesture from a user at 500. The sensor can be an image capture device and/or a touch sensitive pad or component which can be coupled to a display component of the device. The directional hand gesture includes the user using a hand, finger, palm, and/or pointing device to make one or more vertical and/or horizontal motions in front of the display component when interacting with a user interface of the device. In one embodiment, the display component can be a touch wall or touch system.

The sensor can share information of the detected hand gesture with the controller and/or the input application to identify an input mode for the device associated with the directional hand gesture 510. As noted above, the controller and/or the input application can access a list, table, database, and/or file and compare the detected information to predefined information of input modes of the device. If a match is found, the corresponding input mode will be identified to be associated with the directional hand gesture. The controller and/or the input application will then launch the identified input mode of the device and modify a user interlace rendered on the display component based on the input mode at 520.

Launching an input mode can include transitioning the device from a touch screen interface mode to a virtual keyboard interface mode. Additionally, modifying the user interface can include updating the user interface to display the virtual keyboard. In another embodiment, launching an input mode can include modifying a layout of the virtual keyboard or loading another type of virtual keyboard. Further, modifying the user interface can include updating the user interface to change the layout of the user interface or displaying the different type of virtual keyboard. In other embodiments, launching an input mode can include transitioning the device from a virtual keyboard interface mode to a touch screen interface mode. Additionally, modifying the user interface can include updating the user interface to not display the virtual keyboard.

The controller and/or the input application can then modify a setting of sensor based on whether the input mode includes a virtual keyboard at 530. In another embodiment, a setting of the sensor can be modified before the user interface is modified. In other embodiments, a setting of the sensor can be modified in parallel with the user interface being modified. If the launched input mode uses a virtual keyboard, the controller and/or the input application can increase a sensitivity of the sensor to improve an accuracy of detecting inputs as the user accesses the virtual keyboard on the user interface. Increasing the sensitivity can include increasing an amount of power supplied to the sensor. In another embodiment, if the input mode launched does not use a virtual keyboard, the controller and/or the input application can decrease a sensitivity of the sensor. Additionally, decreasing the sensitivity can include reducing an amount of power supplied to the sensor.

In other embodiments, if the input mode is to change a layout of the keyboard or to use another type of virtual keyboard, the controller and/or the input application can increase a sensitivity of the sensor and/or an amount of power supplied to the sensor if not already done so for a virtual keyboard input mode. The controller and/or the input application can further modify the sensor by changing a layout or location of access points of the sensor based on the different layout or type of virtual keyboard when detecting for the use accessing the virtual keyboard. The method is then complete. In other embodiments, the method of FIG. 5 includes additional steps in addition to and/or in lieu of those depicted in FIG. 5.

Figure 6:
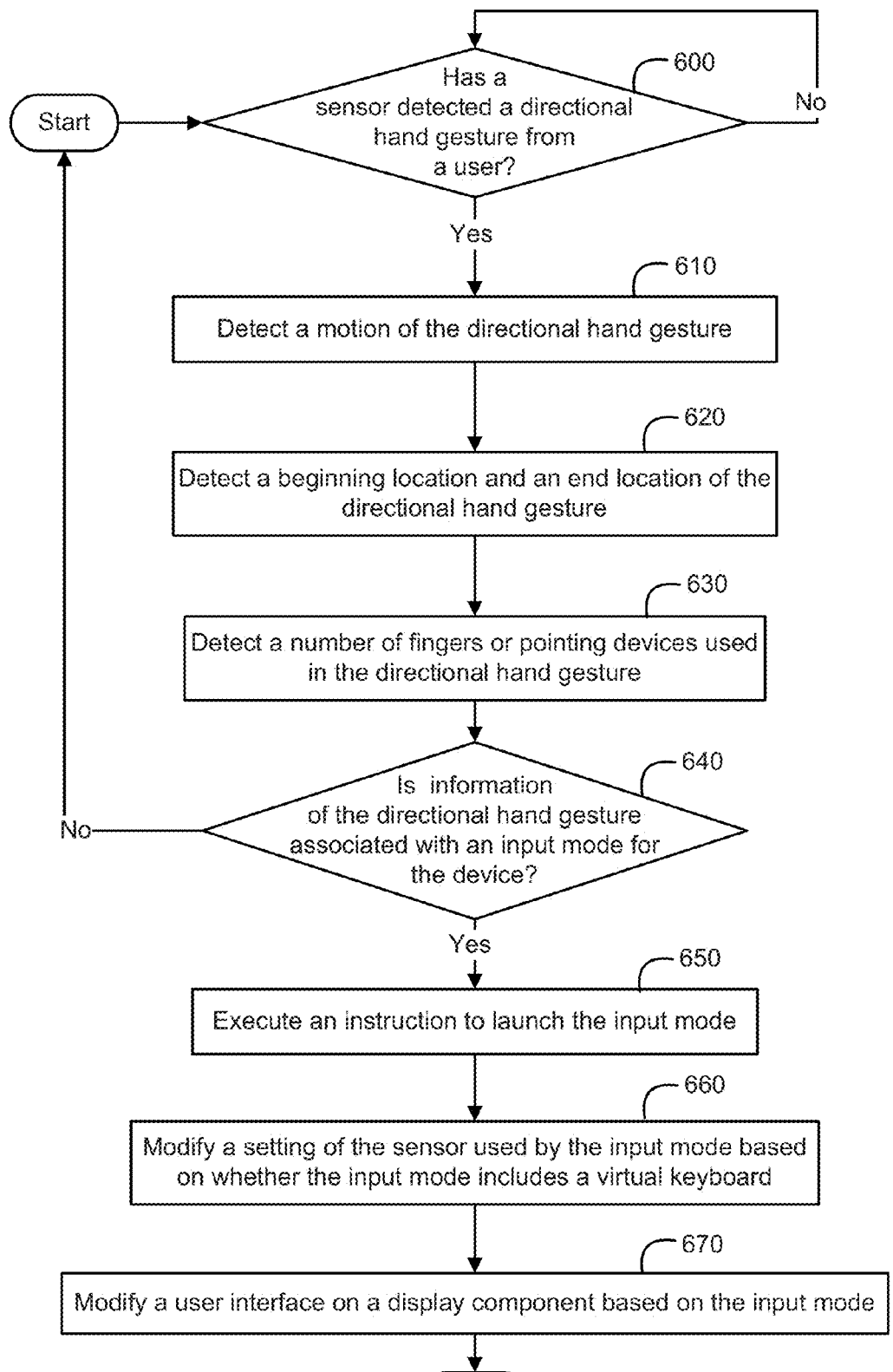
FIG. 6 is a flow chart illustrating a method for managing input for a device according to an example.

FIG. 6 is a flow chart illustrating a method for managing input for a device according to another embodiment. A sensor can initially be used to detect for a directional hand gesture from a user if the user is interacting with a user interface of the device at 600. The sensor can be an image capture component, a touch sensitive pad, a touch surface, and/or a touch screen. The user interface can be a graphical user interface rendered on a screen of a display component. As noted above, the user can make a directional hand gesture with a hand, finger, palm, and/or pointing device by motioning in front of and/or by touching a user interface displayed on the display component.

If no directional hand gesture is detected, the sensor can continue to detect for a directional hand gesture at 600. If a directional hand gesture is detected, the sensor can detect information of the directional hand gesture. When detecting information, the sensor can detect one or more motions of the directional hand gesture at 610. One or more motions can include a vertical motion and/or a horizontal motion. Additionally, the sensor can detect a beginning location and an end location of the directional hand gesture to identify a direction of a hand movement at 620. The beginning location corresponds to where the directional hand gesture begins and the end location corresponds to where the directional hand gesture ends.

The sensor can further detect a number of fingers or pointing devices used by the user as part of the directional hand gesture at 630. In one embodiment, detecting the number of fingers or pointing devices includes the sensor detecting a number of contact points on the screen of the display component. The sensor can pass the detected information of the directional hand gesture with the controller and/or the input application. The controller and/or the input application can compare the detected information to predefined information of input modes of the device when determining whether the directional hand gesture is associated with an input mode of the device at 640.

If no match is found, the sensor can continue to detect for a directional hand gesture at 600. If a match is found, the controller and/or the input application can proceed to execute an instruction to launch the identified input mode at 650. As noted above, launching the identified input mode can include transitioning the device from one input mode to another, such as from a touch screen interface mode to a virtual keyboard interface mode. Additionally, launching the identified input mode can include modifying a setting of the sensor used by the input mode at 660. Modifying the setting can include increasing a sensitivity and/or a power supplied to the sensor to improve accuracy when detecting for inputs if the device transitions to a virtual keyboard interface mode. In another embodiment, the controller and/or the input application can decrease a sensitivity or an amount of power supplied to the sensor if the device transitions from a virtual keyboard interface mode to a touch screen interface mode.

As the setting of the sensor is modified, the controller and/or the input application can modify a user interface rendered on the display component based on the launched input mode at 670. Modifying the user interface can include displaying a virtual keyboard, changing a layout of the virtual keyboard, displaying another type of virtual keyboard, and/or not displaying the virtual keyboard. The method is then complete. In other embodiments, the method of FIG. 6 includes additional steps in addition to and/or in lieu of those depicted in FIG. 6.

What is claimed is:

1. A method for managing input for a device comprising:
   detecting a directional hand gesture with a sensor of the device;
   identifying an input mode of the device associated with the directional hand gesture, where identifying the input mode comprises:
      identifying a virtual keyboard interface mode in response to the directional hand gesture including motion across a touch display screen of the device in a first direction, and
      identifying a further input mode in response to the directional hand gesture including motion across the touch display screen in a second direction different from the first direction;
   launching the identified input mode and modifying a user interface on the touch display screen based on the identified input mode; and
   modifying a setting of the sensor based on whether the identified input mode uses a virtual keyboard.

2. The method of claim 1, wherein detecting for the directional hand gesture includes the sensor detecting for contact points on the touch display screen corresponding to motion of at least one of a hand of a user and a pointing device of the user.

3. The method of claim 1, wherein identifying the input mode of the device includes comparing information of the directional hand gesture to predefined information of input modes of the device.

4. The method of claim 1, wherein modifying the setting of the sensor includes increasing a sensitivity of the sensor if the identified input mode is the virtual keyboard interface mode, and decreasing a sensitivity of the sensor if the identified input mode is the further input mode.

5. The method of claim 1, wherein modifying the setting of the sensor includes decreasing a sensitivity of the sensor if the identified input mode does not include the virtual keyboard.

6. The method of claim 1, wherein modifying the user interface includes updating the user interface to not render the virtual keyboard on the touch display screen, in response to the identified input mode being the further input mode.

7. The method of claim 1, wherein modifying the user interface includes updating the user interface to include the virtual keyboard rendered on the touch display screen, in response to the identified input mode being the virtual keyboard interface mode.

8. A device comprising:
   a touch display screen;
   a sensor to detect a directional hand gesture from a user;
   a controller to identify an input mode of the device associated with the directional hand gesture, launch the input mode, and modify a setting of the sensor used by the input mode based on whether the input mode uses a virtual keyboard, where identifying the input mode comprises:
      identifying a virtual keyboard interface mode that uses the virtual keyboard in response to the directional hand gesture including motion across the touch display screen in a first direction, and
      identifying a further input mode that does not use the virtual keyboard in response to the directional hand gesture including motion across the touch display screen in a second direction different from the first direction; and
   wherein the touch display screen is to display a user interface based on the identified input mode.

9. The device of claim 8, wherein the further input mode includes a touch interface mode for detecting user touch on the touch display screen.

10. The device of claim 8, wherein the sensor includes an image depth capture component.

11. The device of claim 8, wherein the sensor includes a touch component to detect the user touching the touch display screen.

12. A non-transitory computer readable medium comprising instructions that if executed cause a controller in a device to:
   detect a directional hand gesture with a sensor and identify an input mode of the device associated with the directional hand gesture, where identifying the input mode comprises:
      identifying a virtual keyboard interface mode in response to the directional hand gesture including motion across a touch display screen of the device in a first direction, and
      identifying a further input mode in response to the directional hand gesture including motion across the touch display screen in a second direction different from the first direction;
   launch the identified input mode for the device and modify a user interface rendered on the touch display screen based on the identified input mode; and
   modify a sensitivity of the sensor used by the identified input mode based on whether the identified input mode uses a virtual keyboard.

13. The non-transitory computer readable medium of claim 12, wherein detecting the directional hand gesture includes the controller determining whether the directional hand gesture overlaps a virtual keyboard displayed on the touch display screen.

14. The non-transitory computer readable medium of claim 12, wherein identifying the input mode of the device includes accessing at least one of a list, a database, and a table.

15. The method of claim 1, wherein the virtual keyboard interface mode uses the virtual keyboard displayed on the touch display screen, and
   wherein the further input mode is a touch interface mode that detects for user touch on the touch display screen, and that does not use the virtual keyboard.

16. The method of claim 1, wherein the virtual keyboard interface mode uses the virtual keyboard having a first layout of keys displayed on the touch display screen, and the further input mode uses a second virtual keyboard having a second, different layout of keys displayed on the touch display screen.

17. The method of claim 16, wherein the second virtual keyboard uses a language different from a language of the virtual keyboard having the first layout of keys.

18. The method of claim 1, further comprising:
   detecting touch input on the touch display screen in each of the virtual keyboard interface mode and the further input mode; and
   displaying information of an application in the touch display screen, in response to the detected touch input.

19. The non-transitory computer readable medium of claim 12, wherein the virtual keyboard interface mode uses the virtual keyboard displayed on the touch display screen, and wherein the further input mode is a touch interface mode that detects for user touch on the touch display screen, and that does not use the virtual keyboard.

20. The non-transitory computer readable medium of claim 12, wherein the virtual keyboard interface mode uses the virtual keyboard having a first layout of keys displayed on the touch display screen, and the further input mode uses a second virtual keyboard having a second, different layout of keys displayed on the touch display screen.

21. The non-transitory computer readable medium of claim 20, wherein the second virtual keyboard uses a language different from a language of the virtual keyboard having the first layout of keys.

\* \* \* \* \*